UNITED STATES PATENT OFFICE.

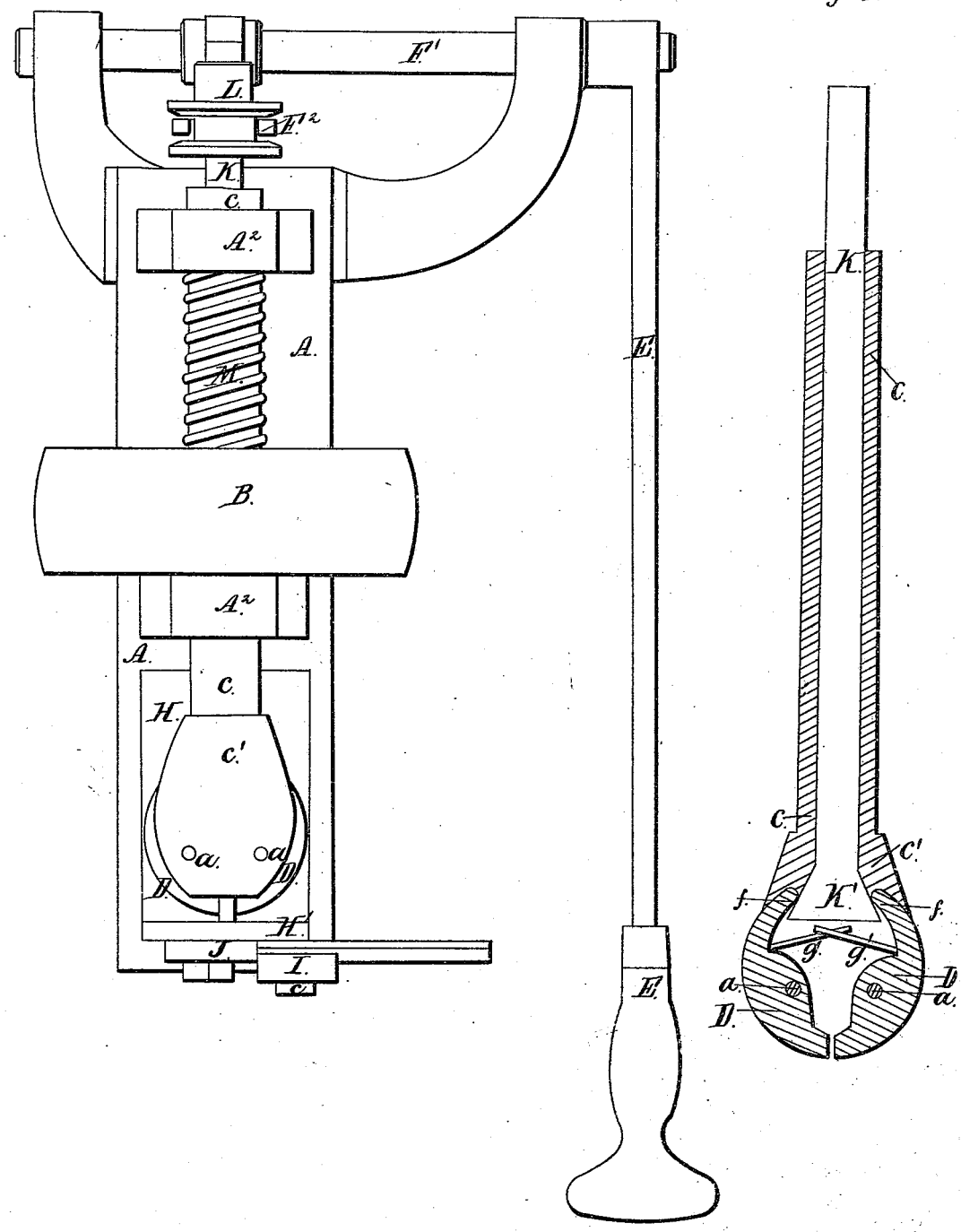

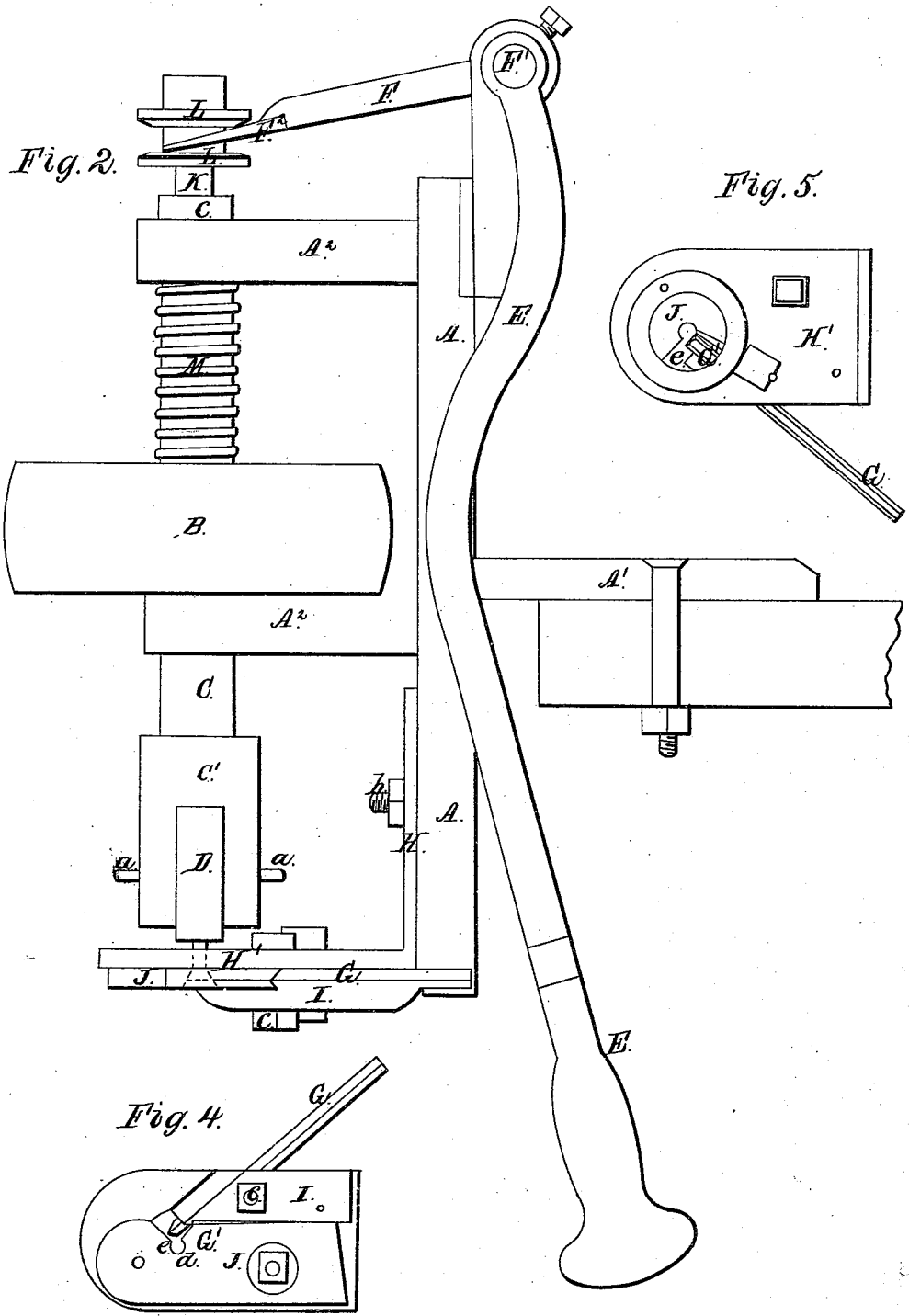

CULLEN WHIPPLE, OF PROVIDENCE, RHODE ISLAND, ASSIGNOR TO ALEX. HODGES.

MACHINE FOR REMOVING THE BURRS FROM THE UNDER SIDES OF THE HEADS OF WOOD-SCREWS.

Specification forming part of Letters Patent No. 3,038, dated April 10, 1843.

*To all whom it may concern:*

Be it known that I, CULLEN WHIPPLE, of the city of Providence, and State of Rhode Island, have invented a new and useful Machine for Removing the Burrs from the Under Sides of the Heads of Wood-Screws, which burrs are raised thereon in the process of making the nick or slit in the head, and which have not heretofore been removed by machinery; and I do hereby declare that the following is a full and exact description thereof.

The machine which I have invented for the foregoing purpose is in the accompanying drawings represented of the full size of that which I have essayed.

Figure 1 is a front view of the machine or of that part opposite to which the person stands who is using it. Fig. 2 is a side view of it; Fig. 3, a section through the main spindle or arbor; Fig. 4, the under face of the machine, and Fig. 5 the upper face of the lower end.

A A is the bed-piece or main frame, which supports the working parts, and which is usually of cast-iron. A' is a piece projecting therefrom by which it may be fastened to a bench.

B is a whirl or pulley on the main arbor or spindle C C. This arbor runs and slides in collars in the heads $A^2$ $A^2$. The arbor C widens out at its lower end C' and is divided, so as to form two cheeks between which the jaws D D are to be received. These jaws work upon pins $a$ $a$, which pass through them and through the cheeks.

H H is an adjustable slide, which is fastened to the bed-piece A by a screw $b$ passing through a slot. The part H' of the adjustable slide, which stands at right angles to the part H, has on its face a piece I, fastened to it by a screw $c$, and this holds the tool G, by which the burrs are to be removed from the under sides of the heads, the proper form being given to the cutting part G' of said tool to adapt it to the bevel of the head.

J is a steel plate, in which there is a countersink $d$ to admit the head of the screw to come into contact with the tool G'. Where the tool is to act upon the head the steel plate J is cut away, as shown at $e$. The arbor C C is tubular, and there passes through it a sliding bolt K, having a wedge-formed head K', by which the jaws D D are to be closed, and this closing will take place as the bolt is drawn back, and the wedge part K' is forced against the tails $ff$ of the jaws.

F' is a shaft, to which is attached an arm F, that is forked at its outer end $F^2$, and is received between collets L L, attached to the sliding bolt K.

E E are a handle and lever by which the sliding bolt K and the spindle C are drawn upward. A spiral spring M surrounds the arbor C, and bearing against the uppermost of the heads $A^2$ and against the pulley B causes the spindle and bolt to descend, when the handle E is allowed to recede and renders the motion in both directions regular and smooth. As the bolt K descends it is brought into contact with the pins $g$ $g$, which are made fast to the jaws, and forces them open.

In using this machine, when the handle E has been moved back and the sliding bolt and arbor have descended, a blank which has been notched is fed in through the countersunk opening in the plate J, so as to enter between the jaws. The handle E is then drawn forward, which closes said jaws and brings the head up against the cutting-edge of the tool G, by which the removal of the burr is instantaneously effected, the edge of the tool projecting a little within the countersink. On removing the handle back the blank is liberated and falls out and another is fed in.

Having thus fully described the nature of my machine for removing the burrs from the under sides of the heads of notched blanks for wood-screws and shown the manner in which the same operates, what I claim therein as new, and desire to secure by Letters Patent, is—

The manner in which I have combined and arranged the hollow arbor or spindle C C, the sliding bolt K, the jaws D D, and the tool or cutter G, with their appendages, so as to constitute an instrument the respective parts of which are constructed for the purpose of and co-operate in effecting the removal of the burr, substantially in the manner set forth.

CULLEN WHIPPLE.

Witnesses:
 JAMES WILSON,
 HENRY MARTIN.